US006613263B2

(12) United States Patent
Kondo

(10) Patent No.: US 6,613,263 B2
(45) Date of Patent: Sep. 2, 2003

(54) METHOD OF WATER PROOFING A TERMINAL CONNECTING PORTION OF SHEATHED WIRE

(75) Inventor: Masayuki Kondo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/729,862

(22) Filed: Dec. 6, 2000

(65) Prior Publication Data

US 2001/0003687 A1 Jun. 14, 2001

(30) Foreign Application Priority Data

Dec. 9, 1999 (JP) .......................................... 11-350584

(51) Int. Cl.⁷ .......................... B29C 45/14; B29C 70/72
(52) U.S. Cl. ........................ 264/263; 264/275; 264/277
(58) Field of Search ................................ 264/259, 263, 264/271.1, 275, 277, 279; 29/418; 425/129.1

(56) References Cited

U.S. PATENT DOCUMENTS

| | | | | | |
|---|---|---|---|---|---|
| 2,399,836 | A | * | 5/1946 | Taylor | 439/762 |
| 2,454,193 | A | * | 11/1948 | Martin | |
| 2,973,501 | A | * | 2/1961 | Mapelsden et al. | |
| 3,668,779 | A | * | 6/1972 | Turner | 264/263 |
| 4,118,097 | A | * | 10/1978 | Budnick | 439/387 |
| 4,556,190 | A | * | 12/1985 | Smith | 264/275 |
| 4,574,474 | A | * | 3/1986 | Langham | 29/858 |
| 4,582,388 | A | * | 4/1986 | Swaffield | 264/272.11 |
| 4,643,511 | A | * | 2/1987 | Gawlik et al. | 439/755 |
| 5,013,495 | A | * | 5/1991 | Noba et al. | 264/275 |
| 5,182,032 | A | * | 1/1993 | Dickie et al. | 264/277 |
| 5,279,030 | A | * | 1/1994 | Ito et al. | 264/272.11 |
| 5,560,879 | A | * | 10/1996 | Tanigawa | 264/138 |
| 5,620,338 | A | * | 4/1997 | Stephens et al. | 439/522 |
| 5,759,052 | A | * | 6/1998 | Seki | 439/189 |
| 6,170,148 | B1 | * | 1/2001 | Van Den Berg | 29/602.1 |

FOREIGN PATENT DOCUMENTS

| | | |
|---|---|---|
| JP | 10-289745 | 10/1998 |
| JP | 10-511716 | 11/1998 |
| JP | 11-120986 | 4/1999 |

* cited by examiner

*Primary Examiner*—Angela Ortiz
(74) *Attorney, Agent, or Firm*—Sughrue Mion, PLLC

(57) ABSTRACT

In order to waterproof a terminal connecting portion of a sheathed wire, in which a terminal fitting and a bare conductor of the sheathed wire are connected with each other, the terminal connecting portion of the sheathed wire is placed into a molding cavity of a molding die such that a bottom face of the terminal connecting portion is closely brought into contact with one of inner faces of the molding cavity. Then molten molding resin is injected into the molding cavity such that a bottom face of a solidified molding resin and the bottom face of the terminal connecting portion define an identical plane.

5 Claims, 7 Drawing Sheets

METHOD OF WATER PROOFING A TERMINAL CONNECTING PORTION OF SHEATHED WIRE

BACKGROUND OF THE INVENTION

The present invention relates to a terminal connecting portion of a waterproofed sheathed wire by resin molding, a method of waterproofing the same and a waterproofing apparatus using the method.

Generally, in a case of a sheathed wire, its front end is stripped to expose conductors therein, and stripped or bare conductors are caulked, and the sheathed wire is connected to an electric part or machinery through a terminal fitting which is crimped by caulking on the bare conductors. Being left to be bare as it is, a water content goes into the sheathed wire owing to capillary phenomenon. For avoiding the phenomenon, the terminal connecting portion including the bare conductors is protected by various covering members for waterproofing.

For example, a grounding terminal fitting described in Japanese Patent Publication No. 10-289745A is waterproofed by covering a thermal shrinking tube on the bare conductors of the terminal connecting portion, heating to deposit it thereon.

FIGS. 10A to 10C conceptually show a technique for water proofing treatment on the terminal connecting portion of the sheathed wire by means of the thermal shrinking tube. In this case, the front end part of the sheathed wire 1 is peeled to be bare conductors 1*a* on which a caulking part 2*b* of the terminal fitting 2 is crimped, and the thus formed terminal connection is connected as an earth cable to such as a vehicle body by screwing, e.g., a screw or bolt 3 into a connecting part 2*a* at the front end of the terminal fitting 2.

For forming the terminal connection by crimping the terminal fitting 2 to the sheathed wire 1, as shown in FIG. 10A, the thermal shrinking tube 5 has been previously inserted in the sheathed wire 1. The thermal shrinking tube 5 is coated on the interior with an adhesive agent (hot melt), and slid forward after crimping the terminal fitting 2 so as to cover almost allover the terminal connection except the connecting part 2*a* at the front end of the terminal fitting 2. Continuously, as shown in FIG. 10B, the thermal shrinking tube 5 is heated and melted especially on the peeled bare electric wire 1*a* to form a covering part 5A. By covering to protect the terminal connection with the covering part 5A, the waterproofing treatment is performed for preventing the water content from penetrating the sheathed wire 1.

Then, the connecting part 2*a* at the front end of the terminal fitting 2 is connected to a vehicle body 4 by a bolt 3. If there occurs a space C corresponding to a size by thickness of the covering part 5A by the thermal shrinking tube 5 between the sheathed wire and the vehicle body 4 as shown in FIG. 10C, inferior conduction is caused between the connection 2*a* and the vehicle body 4. For avoiding such inconvenience, as shown in FIG. 10A, a difference in level is previously formed in a processing step at a boundary between the front connection 2*a* of the terminal fitting 2 and the caulking part 2*b*. A size of the difference in level of a bent part 2*c* compensates the space C occurring by a size of thickness of the covering part 5A.

As another waterproofing method, for example, as a connecting plate for battery holder, described in Japanese Patent Publication No. 11-120986A, such a technique is obviously known which covers to protect the terminal connecting portion with a molding resin, which part is crimped with the terminal fitting on the bare conductor for the water proofing treatment. In this case, as the molding resin, polyamide based hot melt is generally employed. This is melted and injected from the injecting nozzle of the molding die to a molding part which is a molding cavity. Since the melted resin is at high temperature, polyamide based resin is employed for an insulation covering material of the sheathed wire 1, which resin has a heat resistance durable against high temperature of the melted molding resin.

However, the following problems exist in the case of the first related method employing the thermal shrinking tube shown in FIGS. 10A to 10C.

1) For compensating the space C occurring in relation with such as the vehicle body 4 by thickness of the covering part 5A formed by heating to melt, the terminal fitting 2 is provided with the bent part 2*c* to form a level difference. When vibration of the vehicle body is transmitted to the terminal fitting 2 in bent shape via the sheathed wire 1, a bent point 2*d* at a boundary of the difference in level 2*c* is made a vibration fulcrum on which vibration stress acts, and it is probably broken inconveniently due to fatigue as a time passes.
2) Since the use of such thermal shrinking tube 5 requires in advance an operation for inserting it into the sheathed wire 1 and a work of heating to deposit it, productivity does not go up.

On the other hand, the following problems will occur also in the second related method using the above resin molding.

1) Since polyamide based resin having the heat resistance durable against high temperature of the melted mold resin is used for the insulator of the sheathed wire, an expensive heat resistant electric wire cannot but be used for the sheathed wire uneconomically more than necessarily.
2) When polyamide based hot melt is used as the molding resin, inconveniently it is easily embrittled by an oil content as gasoline, and it is very disadvantageous to use it to automobiles.
3) If polyamide based hot melt is used, the terminal fitting should be preheated for heightening adherence when melting, and a processing number is increased as much.
4) The melting temperature when injecting polyamide hot melt is high as 220° C., and labor burden is large on workers due to high temperature.

SUMMARY OF THE INVENTION

It is accordingly an object of the invention to provide a terminal connecting portion of a sheathed wire which enables to reduce working burdens as a representative merit and by far improve producing efficiency by employing a resin molding die in place of the related thermal shrinking tube, for carrying out waterproofing treatment at a terminal connecting portion which is crimped with the terminal fitting to the sheathed wire at a front end thereof via caulking.

In view of the above object, according to the present invention, there is provided a method of waterproofing a terminal connecting portion of a sheathed wire, in which a terminal fitting and a bare conductor of the sheathed wire are connected with each other, the method comprising the steps of:

placing the terminal connecting portion of the sheathed wire into a molding cavity of a molding die such that a bottom face of the terminal connecting portion is closely brought into contact with one of inner faces of the molding cavity; and injecting molten molding resin into the molding cavity such that a bottom face of a solidified molding resin and the bottom face of the terminal connecting portion define an identical plane.

In the above configuration, efficiency in the forming work can be improved in comparison with the related method using the thermal shrinking tube.

Further, since the molding resin is deposited onto almost three sides of the terminal connecting portion (i.e., both side faces and top face), the molding can be made easier.

Preferably, a moisture hardening polyurethane hot melt is used as the molding resin.

In the above configuration, the melting temperature at injecting in the molding die can be determined to be low temperature as, for example, 100° C., and the injecting temperature as 100° C. is very low in comparison with 220° C. of polyamide based hot melt to be used in the related resin molding. By realizing it, operators of molding are released from working at high temperature and the labor burden is considerably reduced. Though the injecting temperature of the moisture hardening polyurethane hot melt of the present embodiment is 100° C., it has a heat resistance against around 160° C. after reaction. This fact is adaptable sufficiently and advantageously under circumstances at high temperature as a vehicle engine room. Further, if using polyamide hot melt, the terminal fitting requires to be preheated in advance for enhancing adherence when melting, the processing step is increase as much, but if using the moisture hardening polyurethane hot melt, the preheating of the metal is unnecessary, and it is useful to decreasing of the processing steps.

Preferably, melt viscosity of the molding resin is 50 [Pa·s] or less. More preferably, the melt viscosity of the molding resin is 20 [Pa·s] or less.

According to the present invention, there is also provided an waterproofing apparatus for realizing the above method, comprising:

a first mold defining a part of a molding cavity, which is provided with a planar face on which a bottom face of the terminal connecting portion of a sheathed wire is closely brought into contact; and a second mold defining another part of the molding cavity, provided with a runner channel positioned so as to oppose to the planer face, through which molten molding is injected into the molding cavity.

In the above configuration, since the runner channel opposes to the planer face, the molten molding resin can be easily poured and deposited onto the top face and both side faces of the terminal connecting portion.

According to the present invention, there is also provided a terminal connecting portion of a sheathed wire which is waterproofed by the above method, comprising a molded portion a bottom face of which define a plane identical with a bottom face of the terminal connecting portion.

In the above configuration, in a case where the terminal fitting is connected to a circuit board of an electric equipment, the bottom face of the terminal connecting portion is closely attached thereon, so that electrically conductive badness is not generated. Furthermore, since it is not necessary to provide the bent portion as shown in the related art of FIGS. 10A and 10B in order to compensate the level difference, the breakage problem of the bent portion due to the vibration stress can be naturally avoided.

DETAILED DESCRIPTION OF THE PREFERRED EMBODIMENTS

There will be explained in detail below one preferred embodiment of the invention with reference to the accompanying drawings.

Figure 1:
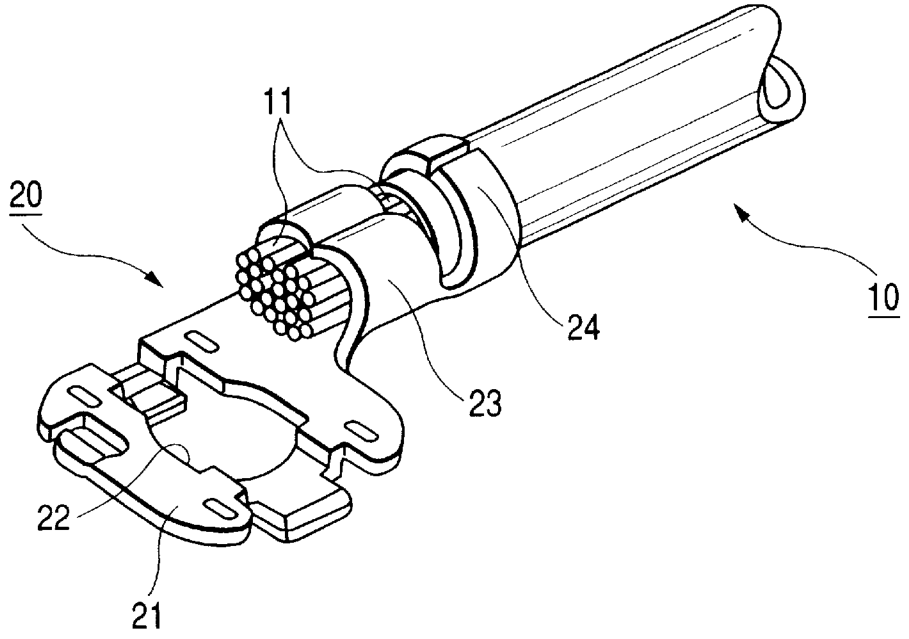
FIG. 1 is an perspective view showing a terminal connecting portion of a sheathed wire in a condition before waterproofing.
Figure 2:
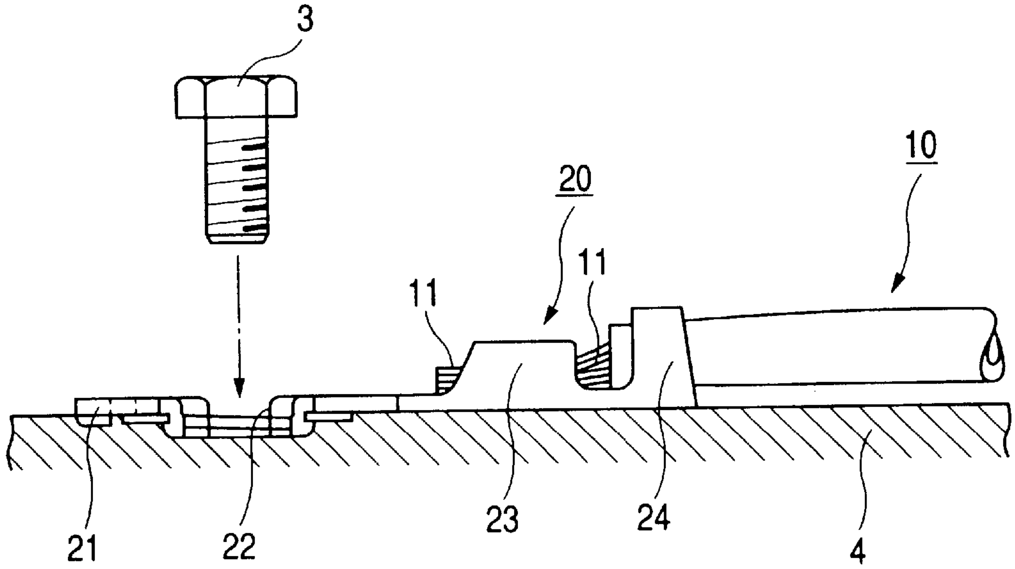
FIG. 2 is a side view showing the terminal connecting portion shown in FIG. 1.

FIG. 1 is a perspective view showing the terminal connecting portion before the waterproofing treatment, in which a terminal fitting 20 is crimped on exposed bare conductors 11 of a sheathed wire 10. FIG. 2 is a side view showing a state where the terminal connecting portion is electrically connected to a vehicle body 4, for example.

Figure 10A:
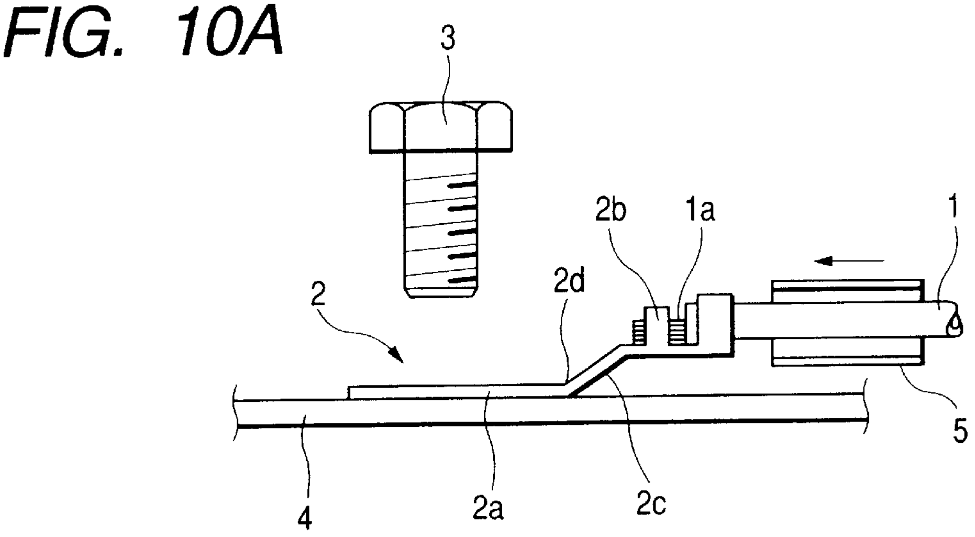
FIGS. 10A to 10C are side views showing a related art and explaining a problem derived therefrom.
Figure 10B:
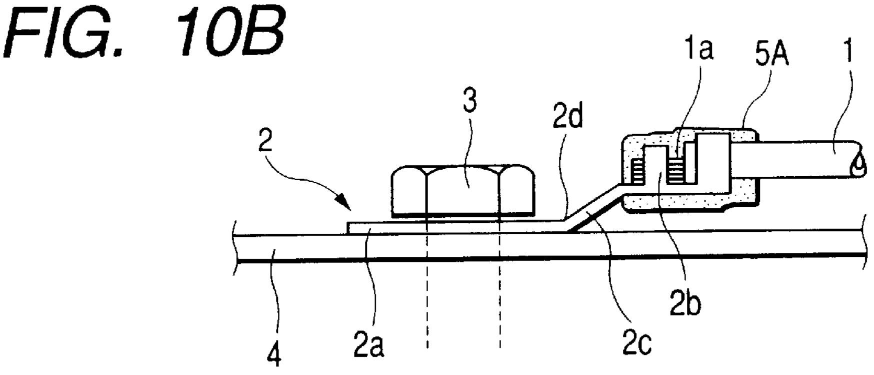
Figure 10C:
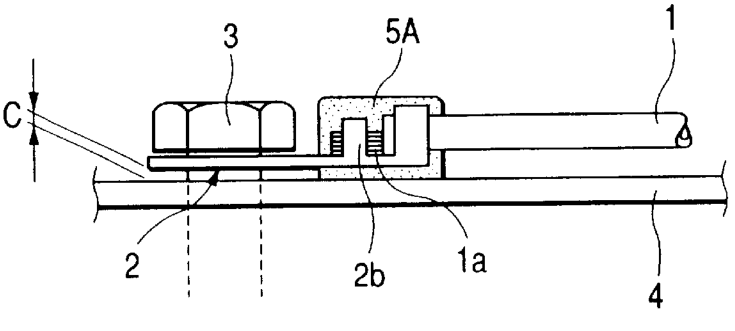

The terminal fitting 20 has the connecting part 21 formed to be flat at the front portion, at a central part of which an opening 22 is defined for inserting the bolt 3 shown in FIGS. 10A to 10C of the related example. The connecting part 21 is formed to be caulking parts 23, 24 at the rear part for crimping to the bare conductors 11.

Figure 3:
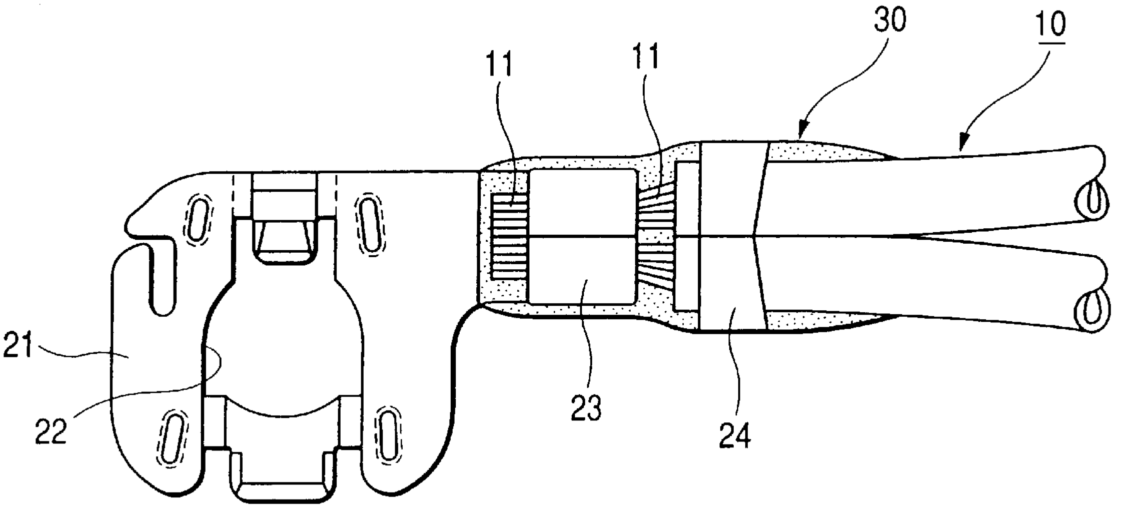
FIG. 3 is a plan view showing, partially in cross section, the terminal connecting portion which has been waterproofed by resin molding, according to one embodiment of the present invention.
Figure 4:
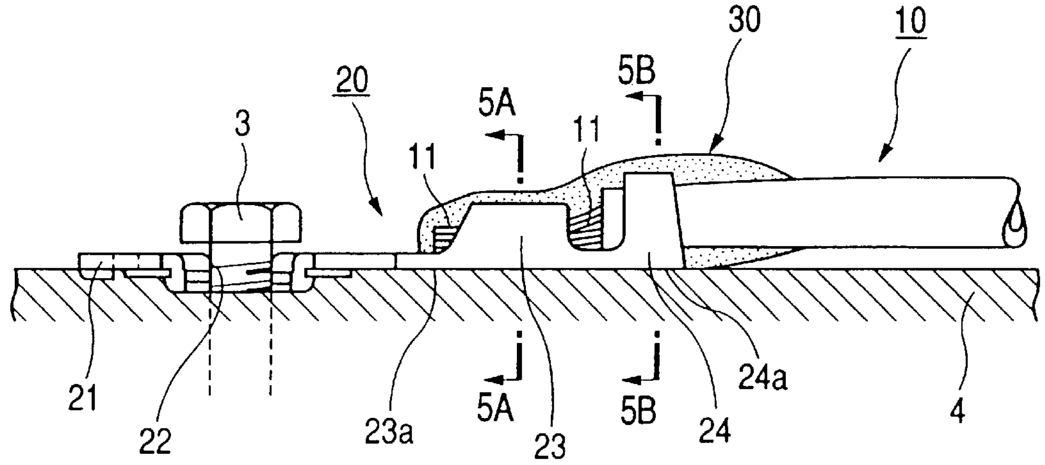
FIG. 4 is a side view showing, partially in cross section, the state that the waterproofed terminal connecting portion is connected to a vehicle body as the earth cable.
Figure 5A:
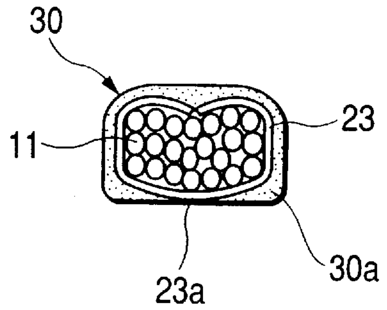
FIG. 5A is a sectional view showing the cross section seen from line 5A—5A of FIG. 4.
Figure 5B:
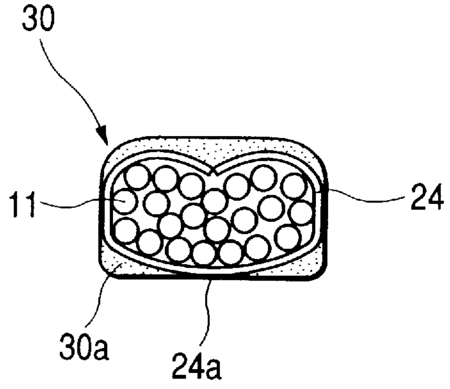
FIG. 5B is a sectional view showing the cross section seen from line 5B—5B of FIG. 4.

FIG. 3 is a plan view showing, partially in cross section, a state where the terminal connecting portion has been waterproofed, in which the molded resin 30 covers almost allover the terminal connecting portion except for the bottom face of the terminal fitting 20 and the front end connecting part 21. FIG. 4 is a side view showing, partially in cross section, a state where the waterproofed terminal connecting portion is connected as the earth cable to the vehicle body with a bolt 3. FIGS. 5A and 5B are sectional views respectively showing cross sections along line 5A—5A and line 5B—5B of FIG. 4.

Figure 7:
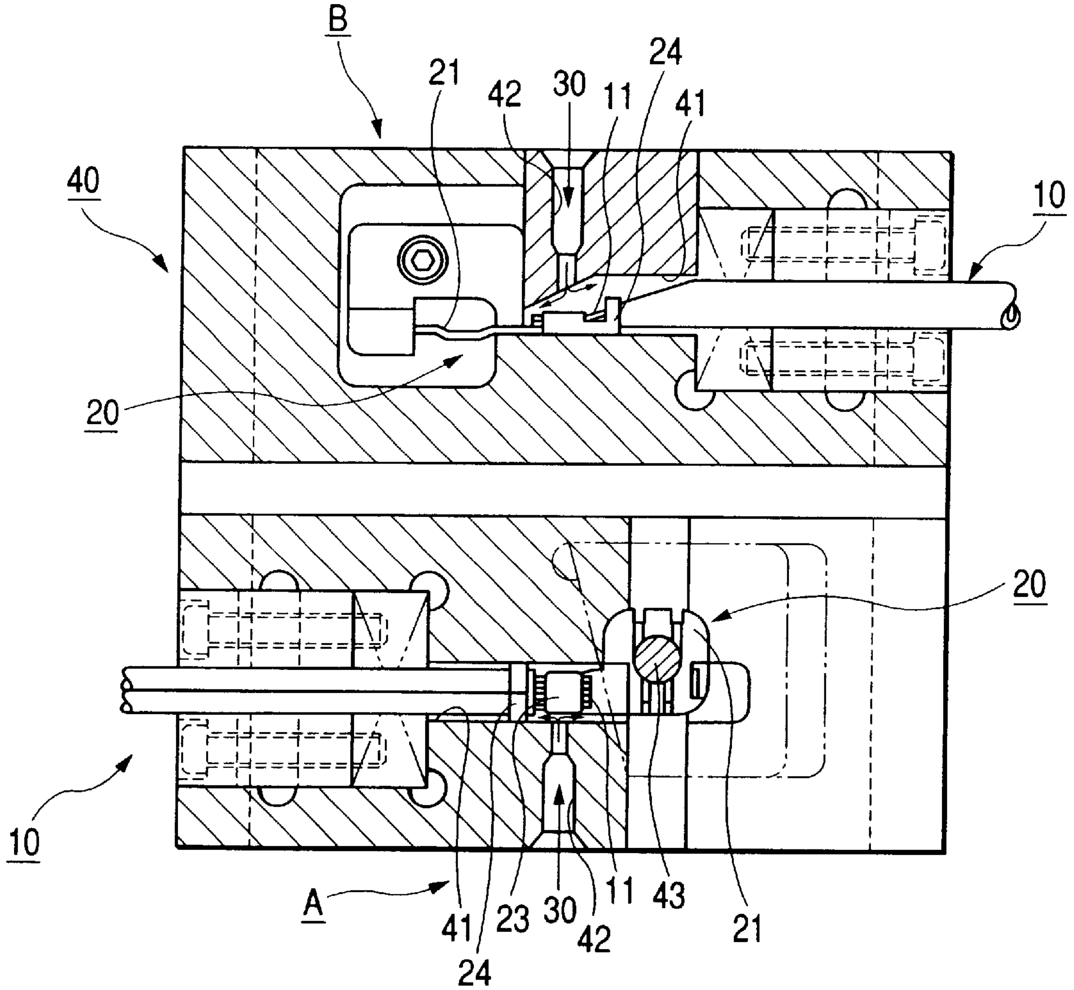
FIG. 7 is a plan view showing a waterproofing apparatus according to the embodiment of the present invention.
Figure 8:
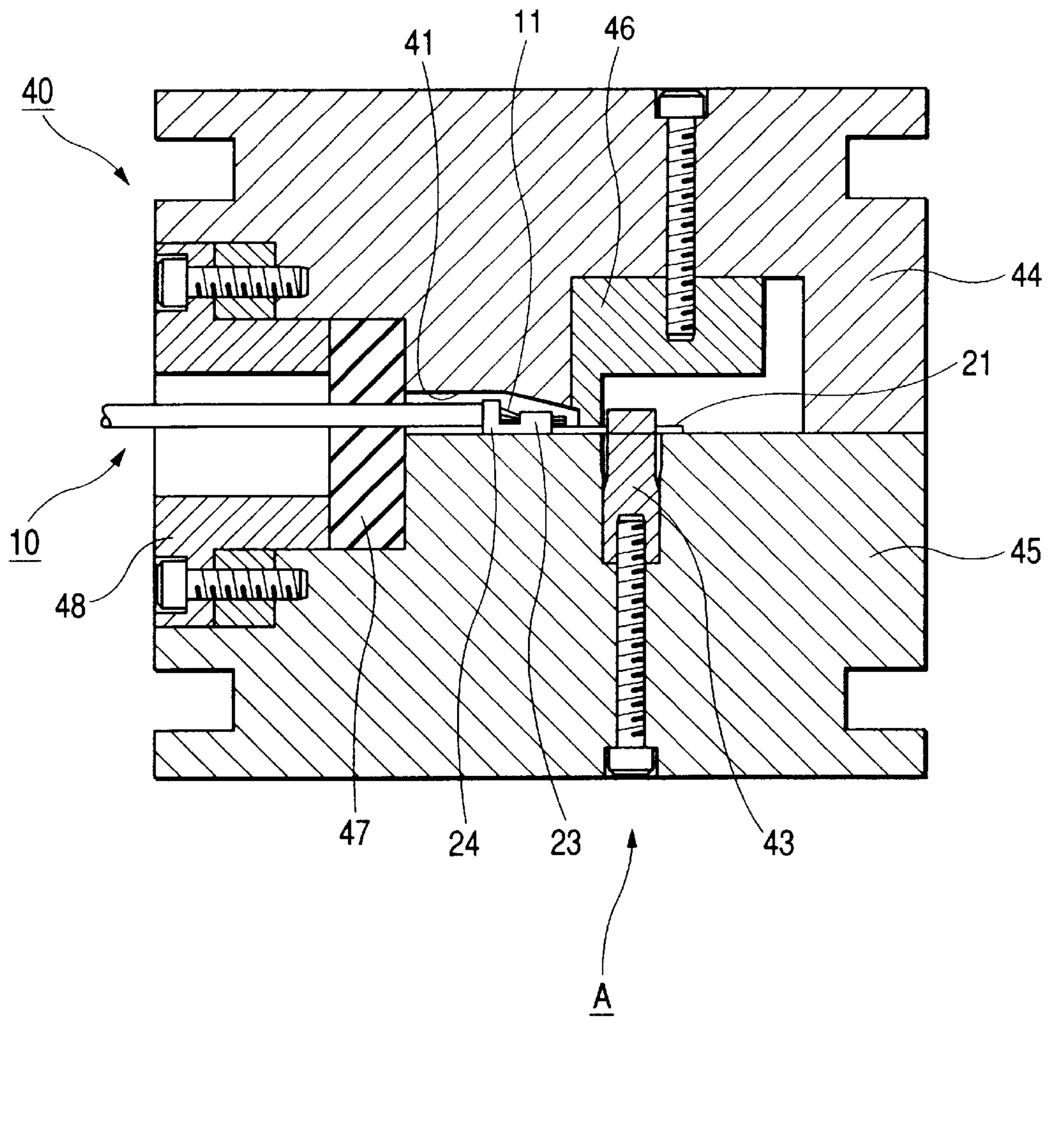
FIG. 8 is a side sectional view showing the mold A in the waterproofing apparatus shown in FIG. 7.
Figure 9:
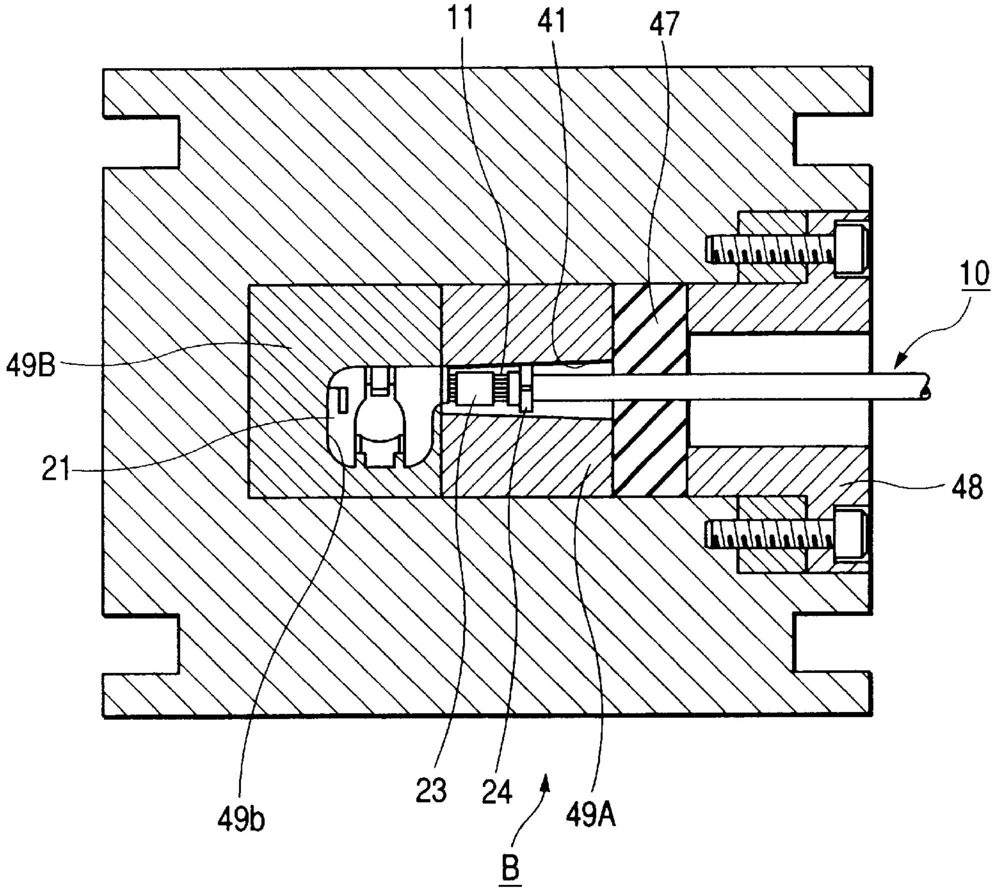
FIG. 9 is a side sectional view showing the mold B in the waterproofing apparatus shown in FIG. 7.

As apparently from FIG. 4 and FIGS. 5A, 5B, the caulking parts 23, 24 of the bare conductors 11 at the front end of the sheathed wire 10 and the terminal fitting 20 are covered with the molded resin 30 by the molding die 40 shown in FIGS. 7 to 9 almost allover the embodied terminal connecting portion after the desired waterproofing, except for a bottom face of the terminal fitting 20 and the connecting part 21 at the front end.

It is important that allover the bottom face of the molded resin 30 deposited on the caulking parts 23, 24 is not upheaved but forms a plane surface in any portions on bottom faces 23*a*, 24*a* of the caulked parts 23, 24. In short, the molded resin 30 is fully deposited to cover the three sides of the upper side and both sides of the terminal connecting portion, and a part of the molded resin 30*a* goes around both respective sides of the caulked bottom faces 23*a*, 24*a*. But thickness of such a part of the molding resin going around the bottom face and deposited is a flat face to an extent of not exceeding a level of the bottom faces 23*a*, 24*a*.

Accordingly, as shown in FIG. 4, being under the condition that the caulking parts 23, 24 are mounted on the vehicle body 4, all the areas of the bottom faces 23*a*, 24*a* contact the upper face of the vehicle body 4, so that no space corresponding to thickness of the deposited resin occurs between the bottom faces and the vehicle body 4 as seen in the related example shown in FIGS. 10A to 10C. Thus, any electrically conductive inferiority can be avoided between the connecting part 21 at the front end of the terminal fitting 20 and the vehicle body 4.

Therefore, the bent part 2*c* aiming at avoidance of conductive badness is no longer required as the terminal fitting 2 of FIGS. 10A to 10C of the related examples, and if the caulking is applied to such as cars, an anxiety about breakage by stress due to vibration is purged in the very terminal fitting 20 of the embodiment.

Figure 6:
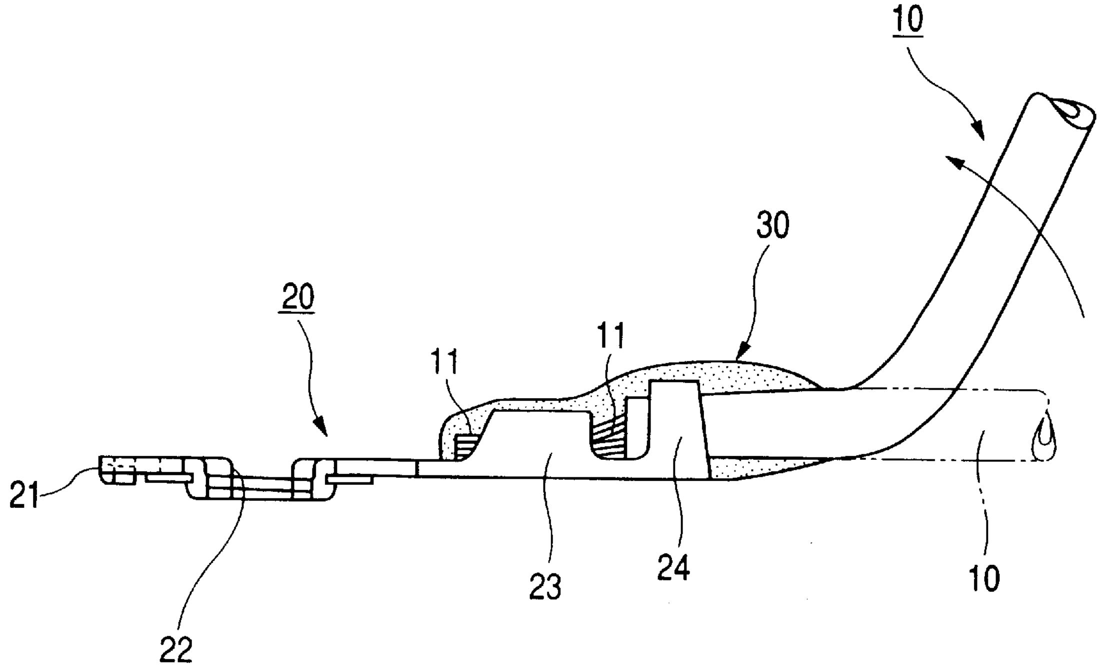
FIG. 6 is a side view showing, partially in cross section, the state that the sheathed wire extending from the waterproofed terminal connecting portion is bent.

The exemplified terminal connecting portion is, as shown in FIG. 6, covered with the molded resin 30 to be a fusiform shape, resulting with a merit less to peel the resin in case the sheathed wire 10 extending therefrom is bent.

Herein, for the molding resin 30 as the sealing resin of high viscosity, in substitution for the related polyamide based hot melt brittle in the oil content as gasoline, the moisture hardening resin, specifically polyurethane hot melt is used as a molding compound.

The moisture hardening polyurethane hot melt disclosed in Japanese Patent Publication No. 10-511716A may be adopted. The melt viscosity is preferably 50 [Pa·s] or lower, more preferably 20 [Pa·s] or lower. The adhesive agent is substantially of non-solvent containing urethane radical. In addition, it is solid at room temperatures, and it is taken as an adhesive agent which is not only physically solidified by cooling after having been used in a melted form, but also solidified by chemical reaction between still existing isocyanate radical and moisture. The "moisture hardenability" means that polyurethane hot melt contains, more specifically silane and/or isocyanate radical generating chain extension reaction with water as a moisture in an air.

Namely, the present embodiment uses the moisture hardening polyurethane hot melt of viscosity 20 Pa·s as one example of the molding resin 30 by the sealing resin of high viscosity, and sets the melting temperature at injecting to be about 100° C. in the molding die 40. As mentioned above, the melting temperature at injecting in the molding die 40 can be determined to be low temperature as, for example, 100° C., and the injecting temperature as 100° C. is very low in comparison with 220° C. of polyamide based hot melt to be used in the related resin molding. By realizing it, operators of molding are released from working at high temperature and the labor burden is considerably lightened.

Even if the injecting temperature of the moisture hardening polyurethane hot melt of the present example is 100° C., this substance has the heat resistance to around 160° C. after the reaction (PuR-Hmi). This fact means that it is sufficiently adapted to use under high temperature circumstances as in vehicle engine rooms.

Next, with respect to a waterproofing method using the moisture hardening polyurethane hot melt as the molded resin 30 and an apparatus using the method, explanation will be made by way of the molding dies 40 shown in FIGS. 7 to 9.

Referring to FIG. 7 of the plan view, in the molding parts A, B provided at two places in the single molding die 40 comprising upper and lower molds 44, 45, the two molding works, that is, simultaneous moldings to the terminal connecting portion can be carried out. FIG. 8 is a cross sectional view of the molding die composed of the upper mold 44 and the lower mold 45 seen from the side of one mold A. FIG. 9 is a side and cross sectional view showing the other mold B.

On the predetermined position of the mold A, one set of terminal connecting portion which is crimped with the terminal fitting 20 on the bare conductors 11 in the sheathed wire 10, is mounted in a manner that the connecting part 21 at the front end is made horizontal. The molding part A is formed to be flat such that the bottom face of the molding cavity 41 can be closely attached to the bottom face of the terminal connecting portion, and the runner channel 42 of the injecting gate is provided in the ceiling face opposite the flat bottom face or in the oblique side. The front end connecting part 21 of the terminal fitting 20 is set flatwise, so that a pin 43 for positioning by passing through the opening 22 stands upright. Further, the molding cavity 41 opens at its one side toward the exterior of the mold, and is closed at its another side with the elastic closing plate 47. The closing with the elastic plate 47 signifies that since the sheathed wire 10 extending rearwards of the terminal fitting 20 does not require the water proofing treatment, said one side gets out of the mold from the one side opening. The leading-out part of the sheathed wire 10 is elastically held by the elastic closing plate 47 which is in turn held by a clamp 48. In such a molding cavity 41, it is easy to pour the melted molded resin 30 from the upper runner channel 42 and to deposit it to the upper side and both sides of the terminal connection.

On the predetermined position of the mold B, another set of terminal connection is mounted in a manner that the connecting part 21 at the front end of the terminal fitting 20 is made vertical and walled to the molding face, and the molded resin 30 is deposited only to the upper side and both sides of the terminal connection in the same procedure as that in the molding part A.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A method of waterproofing a terminal connecting portion of a sheathed wire, in which a terminal fitting, having a holding portion which holds a sheath of the sheathed wire, and a bare conductor of the sheathed wire are connected with each other, the method comprising the steps of:

placing the terminal connecting portion of the sheathed wire into a molding cavity of a molding die such that a bottom face of the terminal connecting portion is brought into contact with one of inner faces of the molding cavity; and injecting molten molding resin into the molding cavity such that a bottom face of a solidified molding resin and at least a part of the bottom face of the holding portion of the terminal connecting portion define an identical plane.

2. The waterproofing method as set forth in claim 1, wherein a moisture hardening polyurethane hot melt is used as the molding resin.

3. The waterproofing method as set forth in claim 2, wherein melt viscosity of the molding resin is 50 [Pa·s] or less.

4. The waterproofing method as set forth in claim 3, wherein the melt viscosity of the molding resin is 20 [Pa·s] or less.

5. The method of claim 1, wherein the solidified molding resin is not formed on a bottom face of the terminal fitting.

* * * * *